United States Patent
Kamiya et al.

(10) Patent No.: US 11,582,437 B2
(45) Date of Patent: *Feb. 14, 2023

(54) CAMERA SYSTEM AND CAMERA CONTROL METHOD

(71) Applicant: Sony Corporation, Tokyo (JP)

(72) Inventors: Koji Kamiya, Kanagawa (JP); Seiji Sato, Kanagawa (JP); Tomoyasu Katsuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,635

(22) Filed: Dec. 4, 2020

(65) Prior Publication Data

US 2021/0092350 A1 Mar. 25, 2021

Related U.S. Application Data

(63) Continuation of application No. 16/008,240, filed on Jun. 14, 2018, now Pat. No. 10,887,583, which is a continuation of application No. 14/873,429, filed on Oct. 2, 2015, now Pat. No. 10,021,374, which is a continuation of application No. 12/970,388, filed on Dec. 16, 2010, now Pat. No. 9,185,390.

(30) Foreign Application Priority Data

Dec. 24, 2009 (JP) ................................ 2009-292608

(51) Int. Cl.
| | |
|---|---|
| *H04N 13/296* | (2018.01) |
| *H04N 13/239* | (2018.01) |
| *H04N 5/232* | (2006.01) |

(52) U.S. Cl.
CPC ....... *H04N 13/296* (2018.05); *H04N 5/23296* (2013.01); *H04N 5/232933* (2018.08); *H04N 13/239* (2018.05); *H04N 2213/001* (2013.01)

(58) Field of Classification Search
CPC ............... H04N 13/239; H04N 13/296; H04N 2213/001; H04N 5/232933; H04N 5/23296
See application file for complete search history.

(56) References Cited

U.S. PATENT DOCUMENTS

| | | |
|---|---|---|
| 5,602,584 A | 2/1997 | Mitsutake |
| 5,903,303 A | 5/1999 | Fukushima et al. |
| 6,396,946 B1 * | 5/2002 | Sogawa ............... H04N 13/189 348/E13.016 |
| 6,549,650 B1 | 4/2003 | Ishikawa et al. |
| 7,327,959 B2 | 2/2008 | Pelletier |
| 8,405,709 B2 | 3/2013 | Hirasawa |

(Continued)

FOREIGN PATENT DOCUMENTS

| | | |
|---|---|---|
| CN | 1011594465 | 2/2009 |
| EP | 0775415 | 5/1995 |

(Continued)

OTHER PUBLICATIONS

Office Action issued in related U.S. Appl. No. 12/963,780 dated Mar. 27, 2012.

*Primary Examiner* — Jessica M Prince
(74) *Attorney, Agent, or Firm* — William S. Frommer; Haug Partners LLP

(57) ABSTRACT

A camera system includes: a first camera and a second camera; a camera adaptor box; and a camera control unit.

14 Claims, 14 Drawing Sheets

(56) References Cited

U.S. PATENT DOCUMENTS

| | | |
|---|---|---|
| 2003/0007680 A1 | 1/2003 | Iijima et al. |
| 2003/0133008 A1 | 7/2003 | Stephenson |
| 2003/0219238 A1 | 11/2003 | Yamaguchi et al. |
| 2005/0077450 A1* | 4/2005 | Baer ............... H04N 13/296 348/E13.025 |
| 2005/0099529 A1 | 5/2005 | Hattori |
| 2007/0018074 A1 | 1/2007 | Kinoshita |
| 2007/0041442 A1 | 2/2007 | Novelo |
| 2007/0146478 A1* | 6/2007 | Butler-Smith ....... H04N 13/239 348/E13.016 |
| 2007/0188650 A1 | 8/2007 | Kobayashi et al. |
| 2007/0285282 A1 | 12/2007 | Nakayama |
| 2008/0024596 A1* | 1/2008 | Li ................... H04N 21/4126 348/E13.064 |
| 2008/0049100 A1 | 2/2008 | Lipton et al. |
| 2008/0117290 A1* | 5/2008 | Mazza ............... H04N 13/239 348/47 |
| 2008/0297623 A1 | 12/2008 | Cho |
| 2009/0015689 A1* | 1/2009 | Murayama ............ H04N 13/133 348/229.1 |
| 2009/0147100 A1* | 6/2009 | Nagamasa ............. H04N 9/68 348/222.1 |
| 2009/0195641 A1 | 8/2009 | Neuman |
| 2009/0251425 A1* | 10/2009 | Sohn .................. G06F 3/041 345/173 |
| 2010/0134847 A1 | 6/2010 | Hasegawa |
| 2011/0035174 A1 | 2/2011 | Lahiri |

FOREIGN PATENT DOCUMENTS

| | | |
|---|---|---|
| JP | 08 251627 | 9/1996 |
| JP | 2001 285849 | 10/2001 |
| JP | 2001 290068 | 10/2001 |
| JP | 2002 77947 | 3/2002 |
| JP | 2004 312545 | 11/2004 |
| JP | 2007 81806 | 3/2007 |
| WO | WO 95/20862 | 8/1995 |

* cited by examiner

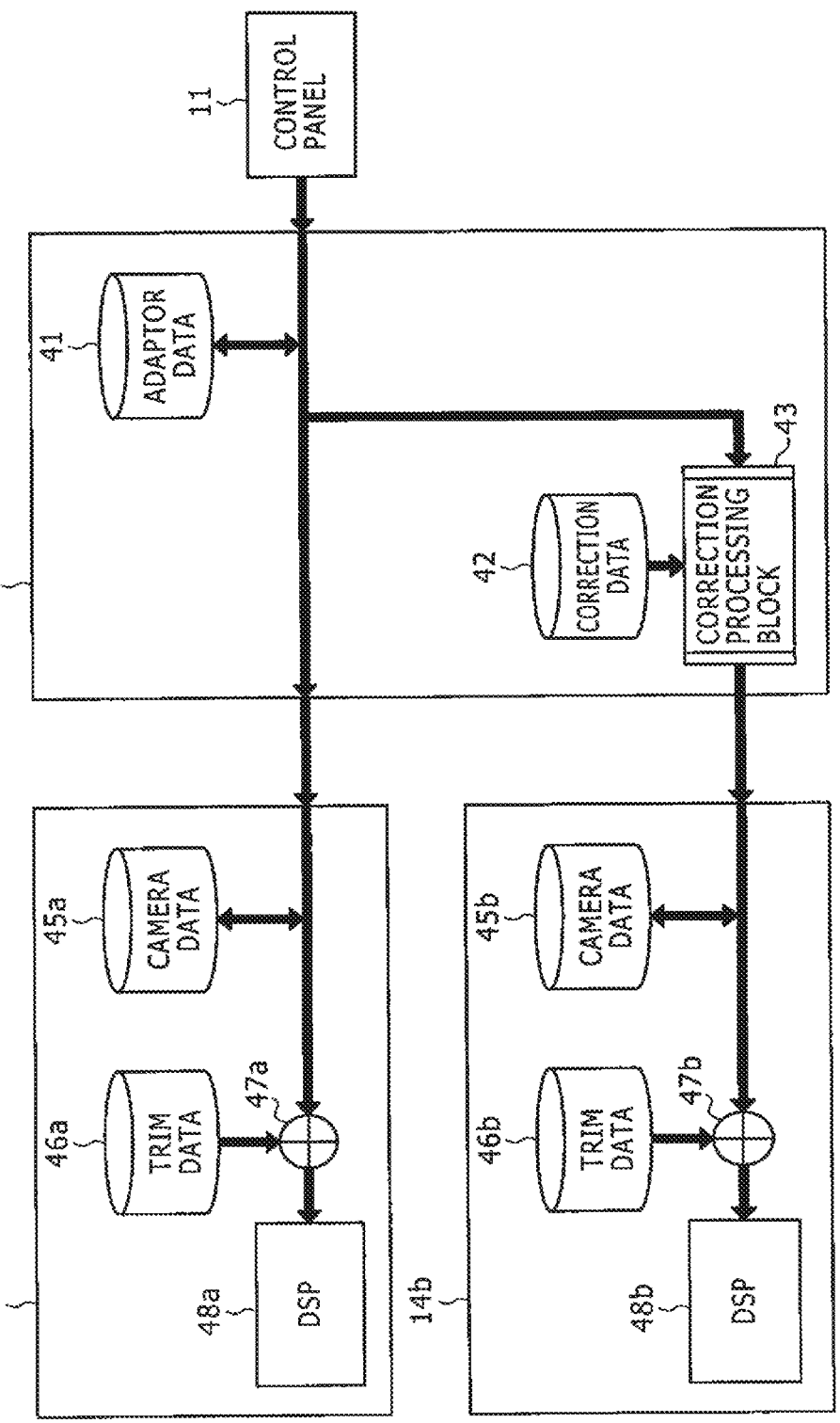

LINE SCAN IMAGING (C-MOS)
NORMAL IMAGING LINE SCAN IMAGING

LINE SCAN IMAGING (C-MOS)
UPSIDE-DOWN IMAGING

CAMERA SYSTEM AND CAMERA CONTROL METHOD

This is a continuation of application Ser. No. 16/008,240, filed Jun. 14, 2018, which is a continuation of application Ser. No. 14/873,429, filed Oct. 2, 2015, now U.S. Pat. No. 10,021,374, issued Jul. 10, 2018, which is a continuation of application Ser. No. 12/970,388, filed Dec. 16, 2010, now U.S. Pat. No. 9,185,390, issued Nov. 10, 2015, which is entitled to the priority filing date of Japanese application number JP2009-292608, filed on Dec. 24, 2009, the entirety of which is incorporated herein by reference.

BACKGROUND OF THE INVENTION

1. Field of the Invention

The present invention relates to a camera system and a camera control method that are suitable for use in applications in which 3D (three dimensional) images are generated from the images taken by two units of cameras, for example.

2. Description of the Related Art 3D camera systems have been in use in which 3D images are obtained by combining the images separately taken by two different cameras.

Referring to FIG. 15, there is shown an exemplary configuration of a related-art 3D camera system 101.

The 3D camera system 101 has two cameras 110a and 110b, control panels 111a and 111b for controlling the operation of each of the cameras 110a and 110b, and a monitor 112 on which images outputted from the cameras 110a and 110b are displayed.

A reference signal is directly entered in each of cameras 110a and 110b and each of the cameras 110a and 110b directly outputs a taken image to an external apparatus.

Referring to FIG. 16, there is shown an exemplary configuration of a related-art 3D camera system 102.

The 3D camera system 102 has camera control units 113a and 113b that are connected to cameras 110a and 110b, respectively, thereby outputting control signals to the camera 110a and 110b and outputting images received from the cameras 110a and 110b. The cameras 110a and 110b are connected to the camera control units 113a and 113b with single link digital optical transmission paths capable of transmitting video signals at a transfer rate of 1.5 Gbps, for example. The camera control units 113a and 113b are also connected to a simultaneous control apparatus 114 configured to simultaneously control the operations of the camera 110a and camera 110b. From this simultaneous control apparatus 114, the restricted functions of the cameras 110a and 110b can be simultaneously controlled. This function is originally intended to simultaneously control two or more system cameras; in this example, this function is applied to the control of the two cameras 110a and 110b.

Referring to FIG. 17, there is shown an exemplary configuration of a related-art 3D camera system 103.

The 3D camera system 103 has a configuration in which two or more of the 3D camera systems 102 shown in FIG. 16 are operated in parallel. Simultaneous control apparatuses 114a through 114c are arranged for the different 3D camera systems 102, thereby controlling the cameras 110a and cameras 110b of each of these 3D camera systems 102.

However, the above-mentioned related-art technologies have no apparatus that is configured to simultaneously totally control the 3D cameras in one 3D camera system.

Japanese Patent Laid-open No. 2002-77947 discloses a technology in which 3D images are obtained by adjusting an inter-image positional shift or an inter-image rotational shift caused between two or more images having a parallax.

SUMMARY OF THE INVENTION

It should be noted that generating a 3D image requires two images having different parallaxes. At this moment, an engineer must operate not only the camera control units and the simultaneous control apparatus, but also adjust two cameras 110a and 110b. Therefore, the engineer must carry out the job that is approximately double when there is only one camera.

For example, in relaying a sports program in a 3D manner, two or more 3D cameras must be arranged at various locations. In addition, because the camera adjustment is required during a relay operation, two or more cameras must be adjusted at the same time. However, the movements of subjects are generally quick in a sports program for example. This not only requires engineers of the high technical operation skills in executing image adjustment, but also makes the 3D camera system complicated, thereby increasing the operation load.

In consideration of the above-mentioned problems, the adjustment of the two cameras 110a and 110b has been practiced by use of camera linking capabilities such as master-slave realized by the simultaneous control apparatuses 114, 114a through 114c, for example. However, as shown in the 3D camera system 103, operating two or more 3D camera systems 102 requires the installation of the same number of master-slave functions as the number of 3D cameras, the cameras 110a and 110b, on the 3D camera system 103. This also causes a problem of increasing the system configuration.

Further, use of a rig mechanism (or a half-mirror mechanism), one of mechanisms for arranging the cameras 110a and 110b in order to configure the 3D camera system 101, requires the inversion of taken images. Therefore, use of a 3D camera system based on the rig mechanism requires to match the timing of taking a subject by the cameras 110a and 110b with the phase of video signals outputted by the cameras 110a and 110b; otherwise, the taken images are delayed to cause an incomplete resultant 3D image.

Therefore, the present invention addresses the above-identified and other problems associated with related-art methods and apparatuses and solves the addressed problems by providing a camera system and a camera control method that are configured to facilitate the operation of two or more cameras without using complicated procedures by simplifying the camera system configuration in generating 3D images.

According to an embodiment of the present invention, there is provided a camera system including: a first camera and a second camera; a camera adaptor box; and a camera control unit. The camera adaptor box has: a correction control block configured to set a difference of the second camera to the first camera on the basis of information indicative of an imaging state in the case where the first camera and the second camera execute imaging operations by a first control value and a second control value outputted from the first camera and the second camera, respectively, output the first control value to the first camera, and output the second control value with the difference corrected to the second camera; an imaging timing adjustment block configured to adjust imaging timings of the first camera and the second camera; and a first video output block configured to output video received from the first camera and the second camera that have executed imaging operations based on the first control value and the second control value with the image timing adjusted. The camera control unit has: an instruction value output block configured to output, to the correction control block, instruction values for instructing operations of the first camera and the second camera that provide the first control value and the second control value; and a second video output block configured to output video received from the first video output block.

As described above, It is possible to set the difference of the second camera relative to the first camera, output the first control value to the first camera, and output a second control value with a difference corrected to a second camera in order to operate two units of cameras.

According to another embodiment of the present invention, there is provided a camera control method including the steps of: setting, by a camera adaptor box configured to control operations of a first camera and a second camera, a difference of the second camera to the first camera on the basis of information indicative of an imaging state in the case where the first camera and the second camera execute imaging operations by a first control value and a second control value outputted from the first camera and the second camera, respectively, outputting the first control value to the first camera, and outputting the second control value with the difference corrected to the second camera; and adjusting imaging timings of the first camera and the second camera. The method further includes the steps of: outputting, by a first video output block, video received from the first camera and the second camera that have executed imaging operations based on the first control value and the second control value with the imaging timing adjusted; outputting, by a camera control unit configured to control operations of the first camera and the second camera via the camera adaptor box, an instruction value for instructing operations of the first camera and the second camera that provide the first control value and the second control value; and outputting the video received from the first video output block.

According to the present invention, a first control value is outputted to a first camera and, at the same time, a second control value with a difference corrected is outputted to a second camera in order to operate two units of cameras. Therefore, an engineer can control the two units of cameras as if the two units of cameras were one unit of camera. This novel configuration facilitates the configuration of the camera system, thereby saving the engineer the load of taking images for 3D imaging. In doing so, the two units of cameras output images that is homogenous to each other because the differences between these images are corrected.

At this time, the two units of cameras output images that are homogenous to each other because the differences between these images are corrected. This novel configuration provides advantages of providing the output suitable for 3D images that are displayed by combining two images.

In order to operate a system of two or more (3D) cameras or largely extend the distance between the camera, the control panel, and the device that receives video signals, a system configuration having a camera control unit (CCU) can be provided to reduce the volume of wiring to the camera side, thereby realizing the flexible operation of the linked imaging with two or more cameras such as live system cameras.

This novel configuration enables 3D cameras to realize a system camera configuration substantially similar to that based on related-art 2D imaging.

BRIEF DESCRIPTION OF THE DRAWINGS

FIG. 8 is a block diagram illustrating exemplary internal configurations of the camera adaptor box and camera heads shown in FIG. 1;

DETAILED DESCRIPTION OF THE PREFERRED EMBODIMENTS

This invention will be described in further detail by way of embodiments thereof with reference to the accompanying drawings. The description will be made in the following order.

1. One embodiment of the invention (a camera control function; namely, an example in which two or more camera heads are used for a 3D camera system)

2. Variations to the above-mentioned embodiment

1. One Embodiment of the Invention

Exemplary Configuration of a 3D Camera System

The following describes one embodiment of the present invention with reference to FIGS. 1 through 14. With one embodiment of the invention, examples of 3D camera systems each having a camera adaptor box 12 configured to output images taken by two camera heads 10a and 10b to an external apparatus by giving image taking instructions to these camera heads 10a and 10.

Figure 1:
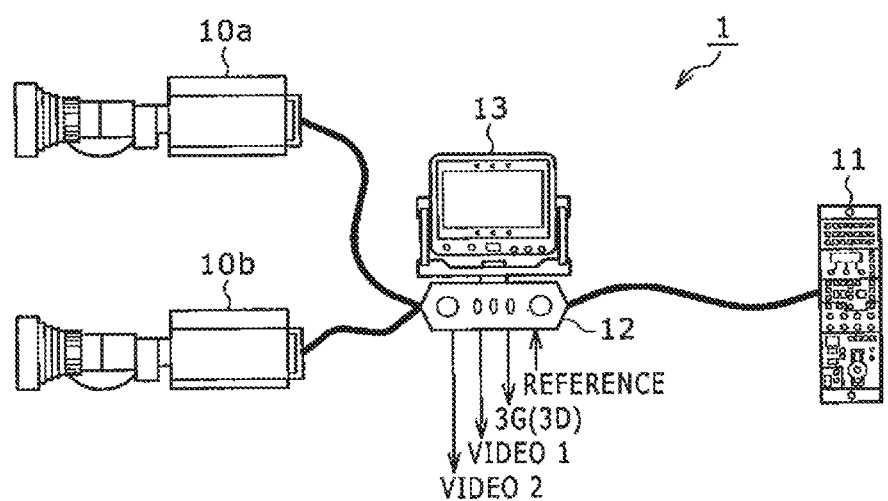
FIG. 1 is a schematic diagram illustrating an exemplary configuration of a 3D camera system made up of camera heads and a camera adaptor box practiced as one embodiment of the invention.

Now, referring to FIG. 1, there is shown an exemplary configuration of a 3D camera system 1.

The 3D camera system 1 has an optical system, an image device, and so on, not shown, and has a camera head 10a and a camera head 10b that are configured to output images of a taken subject. It should be noted that the camera head 10a and the camera head 10b are fixed on a wall for example and have no function of recording taken images.

In the following description, it is assumed that an image outputted by the camera head 10a be used for the right channel (or the right eye) and an image outputted by the camera head 10b be used for the left channel (or the left eye).

Further, the 3D camera system 1 has a camera adaptor box (CAB) 12 configured to control the operations of the camera head 10a and the camera head 10b to execute predetermined processing on the images received from the camera head 10a and the camera head 10b, thereby outputting the processed images. The camera adaptor box 12 has a viewfinder block 13 configured to display the images of a subject taken by the camera head 10a and the camera head 10b, under the control of a video interface block 24 (refer to FIG. 5 below).

Figure 2:
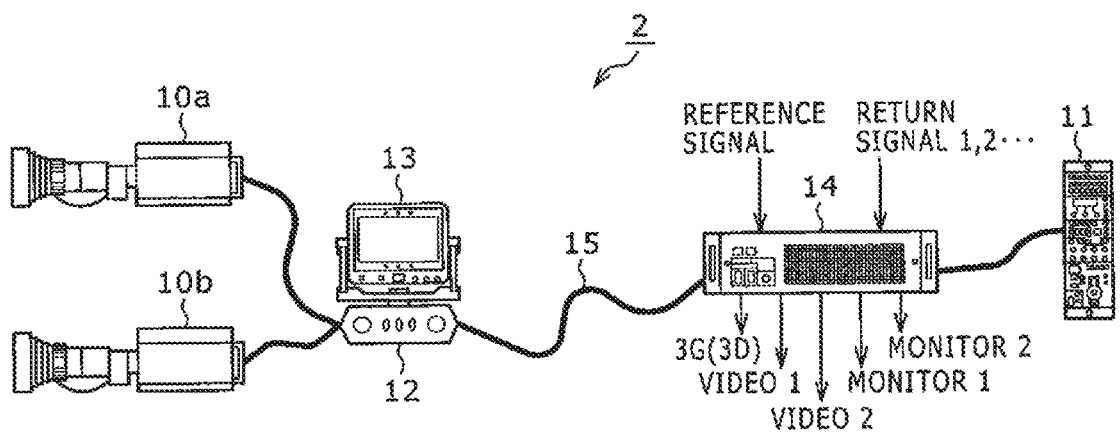
FIG. 2 is a schematic diagram illustrating an exemplary configuration of a 3D camera system in which a camera control unit is added to the 3D camera system shown in FIG. 1.

Referring to FIG. 2, there is shown an exemplary configuration of a 3D camera system 2.

The 3D camera system 2 has a camera head 10a and a camera head 10b, a camera adaptor box 12, and a camera control unit (CCU) 14 that is connected to the camera adaptor box 12 via a camera cable 15. For the camera cable 15, a wide-band digital optical transmission path capable of transmitting massive amounts of optical digital signals. In this example, as compared with a related-art 1.5 Gbps data rate, embodiments of the present invention assume an optical data transmission rate of 3.7 Gbps. It should be noted here that embodiments of the present invention allow video data compression to realize narrow-band transmission (as with related-art technologies).

The camera adaptor box 12 collects images outputted from the camera heads 10a and 10b and transmits these images to the camera control unit 14 over the camera cable 15. As required, the camera adaptor box 12 executes processing, such as inverting images entered from the camera heads 10a and 10b and delaying an output signal so as to provide signal in-phasing.

Between the camera control unit 14 and the camera adaptor box 12, a wideband (more than double a related-art band) communication interface is used. This interface can simultaneously transmit the images outputted from the camera heads 10a and 10b. In addition, the camera control unit 14 has a communication interface compliant with 3G-HDI for example through which the camera control unit 14 can transfer video signals to an external device at high speeds. The camera control unit 14 outputs a control signal received from the a control panel 11 to the camera adaptor box 12 and outputs a video signal received from the camera adaptor box 12 to a display apparatus and a recording apparatus, not shown. Further, the camera control unit 14 is controlled by the control panel 11 operated by an engineer.

As described above, because the camera adaptor box 12 is arranged between the camera heads 10a and 10b and the camera control unit 14, it appears that, from the camera adaptor box 12, the operation of one camera is being controlled from the camera adaptor box 12.

Figure 3:
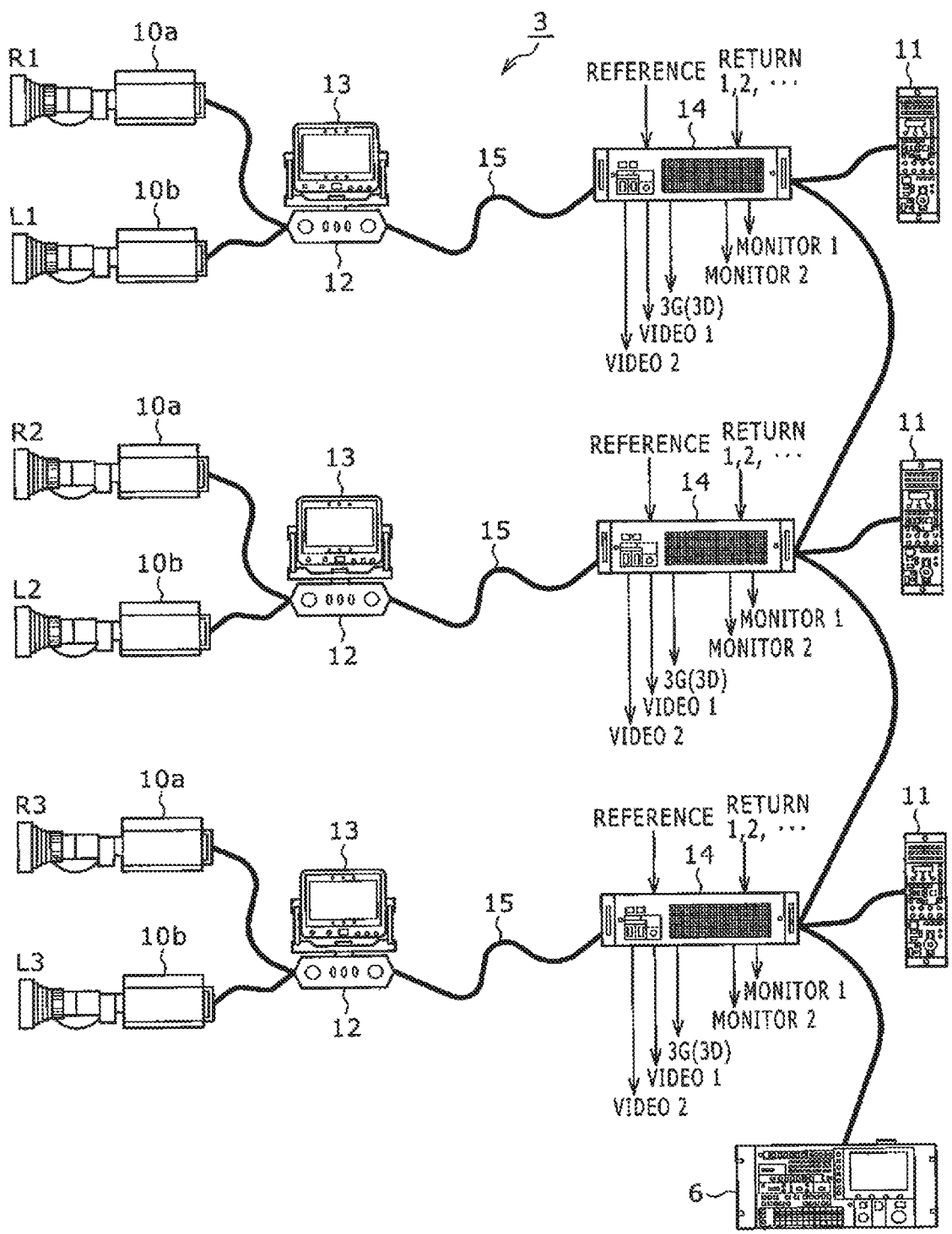
FIG. 3 is a schematic diagram illustrating an exemplary configuration of a 3D camera system in which the two or more 3D camera systems shown in FIG. 2 are arranged in parallel.

Referring to FIG. 3, there is shown an exemplary configuration of a 3D camera system 3.

The 3D camera system 3 is configured in which the 3D camera systems 2 shown in FIG. 2 are operated in parallel. The camera control unit 14 is arranged for each of the 3D camera systems 2. The operation timing between the camera heads 10a and 10b arranged for each 3D camera system 2 is controlled.

The camera control unit 14 is also connected to a simultaneous control apparatus 6 that simultaneously controls the operations of the camera heads 10a and 10b arranged for the 3D camera system 2 that are operated in parallel. The camera adaptor box 12 can differentiate a control value by a difference in the operation of the camera head 10b for the camera head 10a, thereby controlling the operations of the camera heads 10a and 10b as if these cameras are one unit of camera. Consequently, as compared with related-art 3D camera systems 101 through 103, the 3D camera system 3 can be simplified in configuration. The camera head 10a, the camera head 10b, the camera adaptor box 12, the camera control unit 14, and the simultaneous control apparatus 6 are interconnected by a network. The connection between these components is realized by coaxial cables, triaxial cables, optical fiber cables, wireless communication, and other communication media.

Figure 4A:
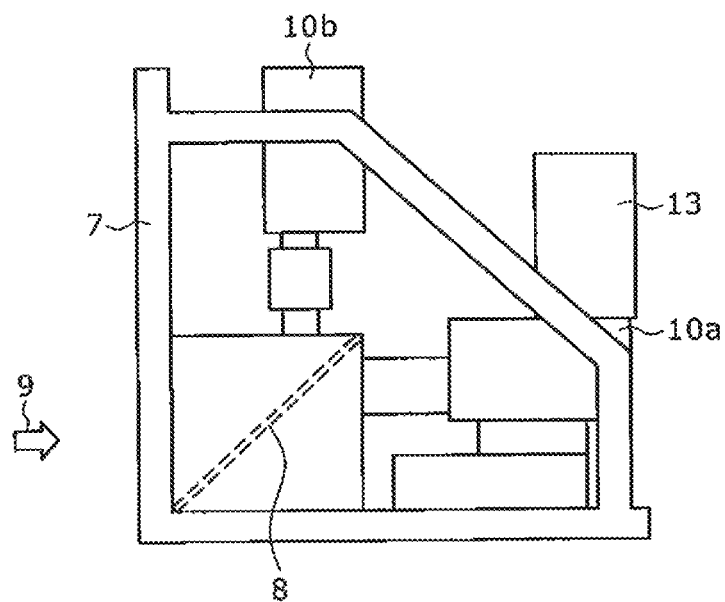
FIGS. 4A and 4B are schematic diagrams illustrating an exemplary camera mount on which the two 3D cameras shown in FIG. 1 are mounted.
Figure 4B:
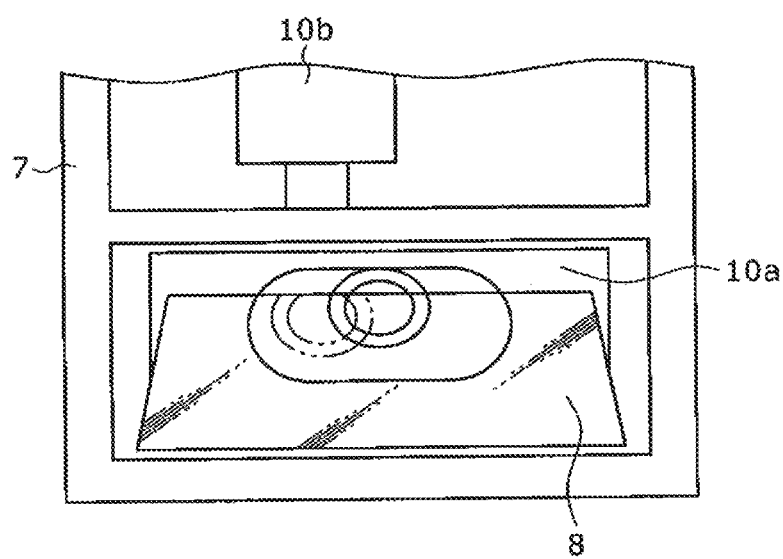

Referring to FIGS. 4A and 4B, there is shown an exemplary configuration of a mount (RIG) 7 on which the camera heads 10a and 10b are mounted.

FIG. 4A shows an exemplary configuration of the camera heads 10a and 10b when the mount 7 is viewed from one side.

Basically, it is known that, if the camera heads 10a and 10b be arranged with the zoom of the camera heads 10a and 10b equal one and a lens distance thereof matched with the human eye, a 3D image obtained from the images taken the camera heads 10a and 10b thus arranged looks natural. However, because the housings of the camera heads 10a and 10b are relatively large and, if the camera heads 10a and 10b are arranged side by side for imaging, a subject is taken with a parallax wider than that of the human eyes, resulting in an unnatural 3D image. Hence, the mount 7 has a half mirror 8. The first camera head 10a is arranged at a position where the image of a subject is directly enters through the half mirror 8. The second camera head 10b is arranged at a position where the image of the subject enters after being reflected from the half mirror 8. Thus, the camera heads 10a and 10b are arranged such that the optical axes of the lenses of the camera heads 10a and 10b vertically cross each other.

FIG. 4B shows an example of how the half mirror 8 looks when viewed from the direction of arrow 9. The camera heads 10a and 10b are arranged on the mount 7 by shifting from each other in a distance obtained by the parallax of the human eyes. Hence, the lens of the camera head 10a looking through the half mirror 8 and the lens of the camera head 10b looking as reflected from the half mirror 8 are shifted from each other in the horizontal direction. Thus, arranging the half mirror 8 on the mount 7 allows the installation of the camera heads 10a and 10b in match with the parallax of the human eyes, thereby producing a naturally looking 3D image.

Figure 5:
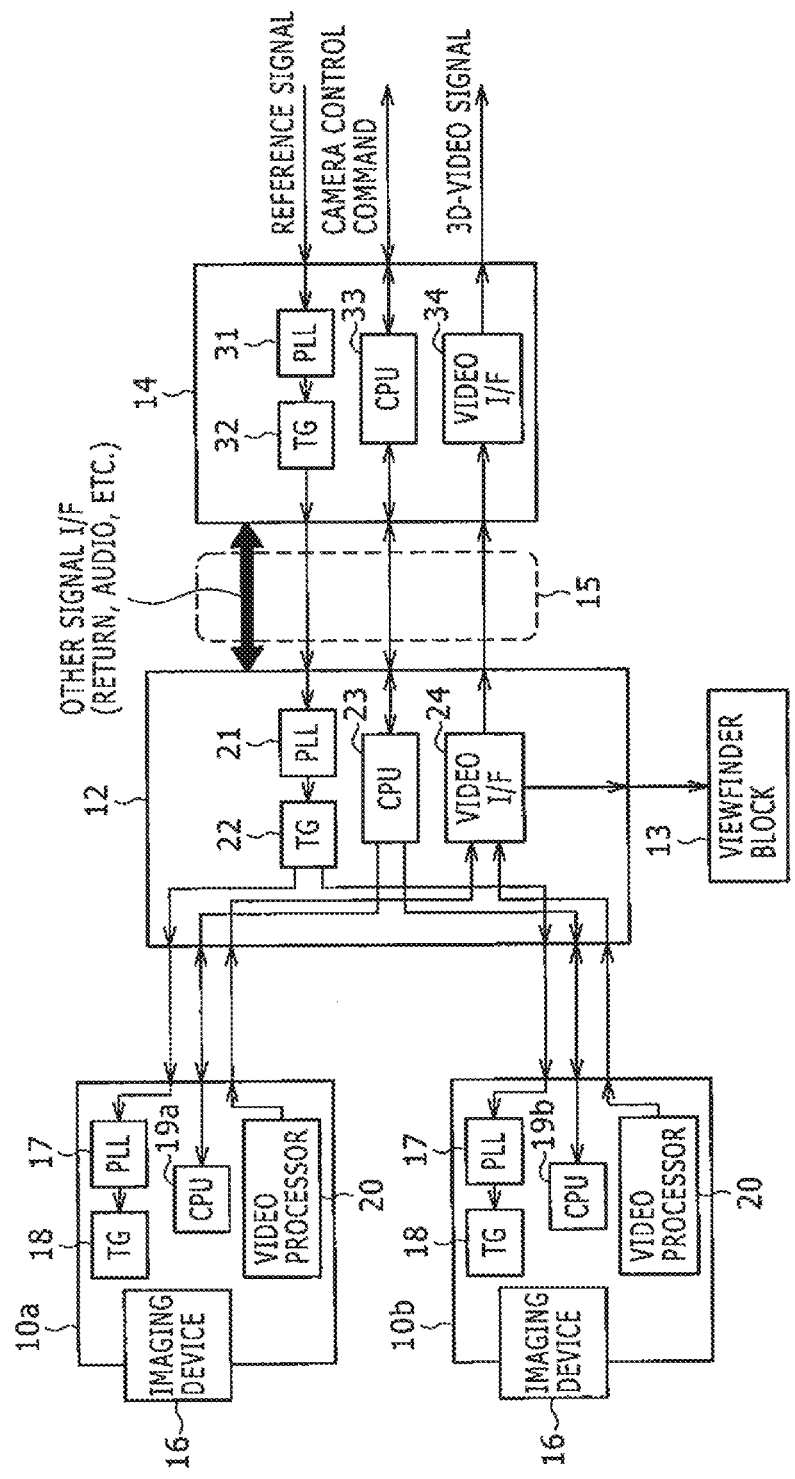
FIG. 5 is a block diagram illustrating an exemplary internal configuration of the 3D camera system shown in FIG. 1.

Referring to FIG. 5, there is shown an exemplary internal configuration of the 3D camera system 2.

The camera head 10a has an imaging device 16 that outputs a video signal. The imaging device 16 is made up of a CCD (Charge Coupled Device) imager or a CMOS (Complementary Metal Oxide Semiconductor) sensor, for example.

The camera head 10a has a PLL (Phase Locked Loop) circuit 17 for executing a PLL operation under the control of the camera adaptor box 12 and a timing generation circuit 18 for generating an imaging timing signal of the imaging device 16 by a PLL operation of the PLL circuit 17. In addition, the camera head 10a has a CPU 19a for controlling each of the components of the camera system and a video processor 20 that executes predetermined processing on a video signal outputted from the imaging device 16 to output the processed video signal to the camera adaptor box 12.

It should be noted that the camera head 10b is generally the same in configuration as the camera head 10a except a CPU 19b instead of the CPU 19a. Therefore, the similar components of the camera head 10b are denoted by the same reference numbers as those of the camera head 10a and the description of the similar components will be skipped for the brevity of description.

The camera adaptor box 12 has a PLL circuit 21 for executing a PLL operation under the control of the camera control unit 14 and a timing generation circuit 22 for generating an imaging timing signal for controlling the imaging timings of the camera heads 10a and 10b by a PLL operation of the PLL circuit 21. In addition, the camera adaptor box 12 has a CPU 23 for controlling each component of the camera adaptor box 12, a video interface block 24 for executing predetermined processing on the video signals supplied from the camera heads 10a and 10b to output the processed signals to the camera control unit 14, and a viewfinder block 13. A viewfinder signal is supplied to the viewfinder block 13 from the video interface block 24. The images of a subject are shown on the camera heads 10a and 10b, allowing the engineer to check the taken images (refer to FIGS. 13A to 14C to be described later).

The camera control unit 14 has a PLL, circuit 31 that executes a PLL operation on the basis of a reference signal supplied from an external apparatus, not shown, and a timing generation circuit 32 that generates a timing signal for controlling the operation timing of the camera adaptor box 12 by a PLL operation of the PLL circuit 31. In addition, the camera control unit 14 has a CPU 33 that controls the processing of each component of the camera control unit 14 in cooperation with the CPU 23 of the camera adaptor box 12 and a video interface block 34 that executes predetermined processing on the video signal supplied from the camera adaptor box 12 to output the processed video signal to an external apparatus, not shown.

The following describes the operation of each component mentioned above.

The CPU 33 of the camera control unit 14 functions as an instruction value output block that outputs instruction values for instructing the CPU 23 to instruct the operations of the camera heads 10a and 10b, these instruction values serving as the basis for the first and second control values. Then, the video interface block 34 of the camera control unit 14 outputs the images received from the video interface block 24 of the camera adaptor box 12 to an external apparatus, not shown.

The CPU 23 of the camera adaptor box 12 receives command signals of one line that are transmitted in a multiplexed manner from the camera control unit 14 through the camera cable 15. Then, the CPU 23 outputs the first and second control values that almost equalize the change ratio of imaging operations such as aperture and white balance of the camera heads 10a and 10b to the camera heads 10a and 10b.

At this moment, the camera adaptor box 12 includes the following control values in a received command signal and outputs this command signal to the camera heads 10a and 10b. At this moment, on the basis of the information indicative of the imaging state at the time the camera heads 10a and 10b execute imaging operations, the CPU 23 must set the differential data between the first camera and the second camera beforehand by the first and second control values outputted to the camera heads 10a and 10b. Therefore, the CPU 23 stores the differential data between the camera heads 10a and 10b and, by use of this differential data, functions as a correction control block for outputting the first control value to the first camera head 10a and the second control value obtained by correcting the differential data to the second camera head 10b. AS a result, the camera heads 10a and 10b can be handled as if these camera heads were one unit of camera by applying the differential data to the control command to be received from the camera control unit 14.

With the camera adaptor box 12, a voltage control oscillator of the PLL circuit 21 is PLL-locked on the basis of a reference signal received from the camera control unit 14. The timing generation circuit 22 functions as an imaging timing adjustment block that outputs an imaging timing signal for adjusting the imaging timings of the camera heads 10a and 10b to the PLL circuit 17 of the camera heads 10a and 10b. This allows the matching between the imaging timings of the camera heads 10a and 10b. The timing generation circuit 22 generates imaging timing signals (T1 and T2) for use by the camera heads 10a and 10b, respectively. If there occurs an misalignment between the imaging timing signals (T1 and T2) in the two cameras as a 3D image due to camera image inversion processing for example, the imaging timing signals (T1 and T2) can be shifted together so as to correct the misalignment.

As shown in FIGS. 4A and 4B, if the mount 7 is of a rig type requiring image inversion, it is required to match both the imaging timings of the camera heads 10a and 10b and the video output timings. Therefore, the camera adaptor box 12 has an image delay function in addition to the image inversion function. It should be noted that, along with the image inversion function, the image delay function may be installed on the camera heads 10a and 10b or the camera adaptor box 12.

When the camera heads 10a and 10b receives imaging timing signals, the PLL circuit 17 executes a PLL operation on each camera head in a proper phase. Hence, in the system operation, the two camera heads 10a and 10b are simultaneously controlled, thereby allowing the camera adaptor box 12 to operate as if one unit of camera.

The video interface block 24 of the camera adaptor box 12 functions as a video output block that outputs images received from the camera heads 10a and 10b which executed imaging operations on the basis of the first and second control values with the imaging timings adjusted by imaging timing signals. If the imaging device 16 is a CMOS sensor based on line scan imaging (the CCD imager is of image planar scanning), then the camera heads 10a and 10b each have a function of changing the sequence of up/down directions at the time when an image is inverted in the up/down directions. Hence, the camera adaptor box 12 can adjust the image distortion direction caused by a rolling shutter effect.

At this moment, the video interface block 24 vertically inverts the image received from one of the camera heads 10*a* and 10*b* in match with the image received from the other camera head and outputs a resultant image.

Next, the timing generation circuit 22 outputs an imaging timing signal to that other camera head by delaying the imaging timing by one frame.

In addition, the camera adaptor box 12 can select, as a viewfinder signal, an output from the camera head 10*a*, an output from the camera head 10*b*, a mixed output from both the camera heads 10*a* and 10*b*, or a differential output from the camera head 10*a* to the camera head 10*b* and display the selected signal. Display examples of this outputted image will be described later (with reference to FIGS. 13A to 14C).

Further, the camera adaptor box 12 has a function of switching between the main line and the return signal to output a viewfinder, signal to the viewfinder block 13. If the viewfinder block 13 is compatible with 3D image display, the viewfinder block 13 can receive a 3D viewfinder signal from the video interface block 24 to display a 3D image. In this case, the video interface block 24 can add characters (or character information) and markers, for example, that are displayed on the viewfinder block 13 to the viewfinder signal so as to display these characters and markers in a 3D manner. For this purpose, the camera adaptor box 12 can set characters and markers at any distances by putting these characters and markers into the consideration of 3D perspective effect.

It should be noted that, for an exemplary application, the differential data for camera control may not be stored in the camera adaptor box 12. For example, the differential data may be stored in the camera head 10*a* or the camera head 10*b* to manipulate, inside the camera head 10*a* or the camera head 10*b*, the control data (or commands) supplied from the camera control unit 14. Control items include most of the camera control items, such as iris, white balance, pedestal, gamma, filter, flair, black gamma, knee, and saturation.

Figure 6:
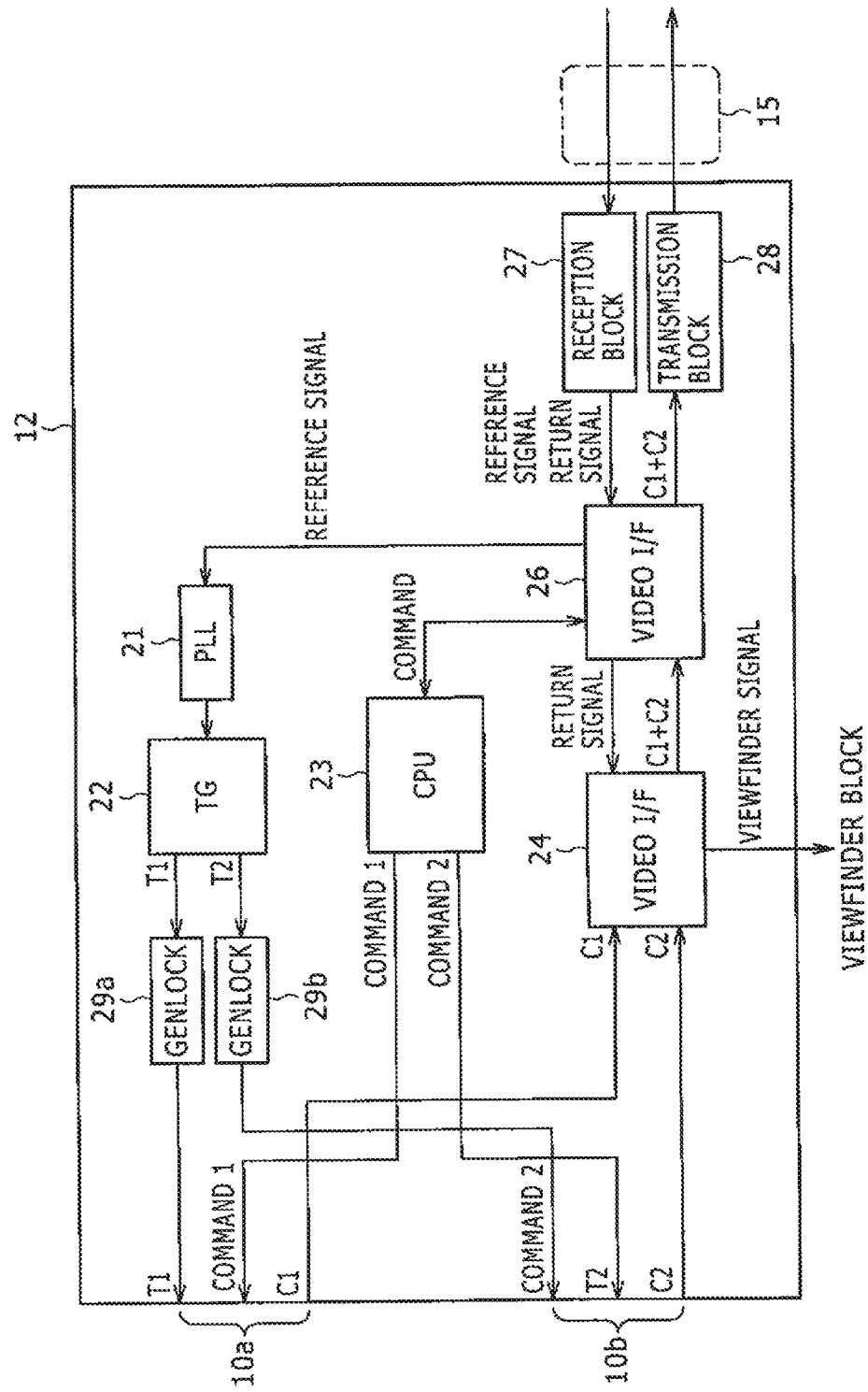
FIG. 6 is a block diagram illustrating an exemplary internal configuration of a camera adaptor box shown in FIG. 1.

Referring to FIG. 6, there is shown an exemplary internal configuration of the camera adaptor box 12.

The camera adaptor box 12 has a reception block 27 for receiving command signals entered over the camera cable 5 and a transmission block 28 for transmitting video signals received from the camera heads 10*a* and 10*b* to the camera control unit 14.

Further, the camera adaptor box 12 has a timing generation circuit 22 for generating imaging timing signals (T1 and T2) for simultaneously controlling the camera heads 10*a* and 10*b* by a PLL operation of the PLL circuit 21. In addition, the camera adaptor box 12 has genlock circuits 29*a* and 29*b* for transmitting imaging timing signals (T1 and T2) to the camera heads 10*a* and 10*b* with predetermined timings, thereby genlocking the camera heads 10*a* and 10*b*.

In addition, the camera adaptor box 12 has a video interface block 24 for receiving video signals (C1 and C2) from the camera heads 10*a* and 10*b* and transmitting a viewfinder signal to the viewfinder block 13 and transmitting the video signals (C1 and C2) to a video interface block 26 in the next stage.

The video interface block 24 outputs, to the viewfinder block, any one of an image outputted from the camera head 10*a*, an image outputted from the camera head 10*b*, a mixed image outputted from the camera heads 10*a* and 10*b*, a differential image obtained by subtracting the image outputted from the camera head 10*b* from the image outputted from the camera head 10*a*, divided images obtained by dividing the images outputted from the camera heads 10*a* and 10*b* at the center of screen, the divided images being simultaneously displayed, and a 3D image.

Further, the camera adaptor box 12 has the video interface block 26 for transmitting a reference signal received by the reception block 27 to the PLL circuit 21, transmitting a return signal to the video interface block 24, and transmitting and receiving command signals with the CPU 23. The video interface block 26 also has a function of transmitting video signals (C1 and C2) received from the video interface block 24 to a transmission block 28.

Figure 7:
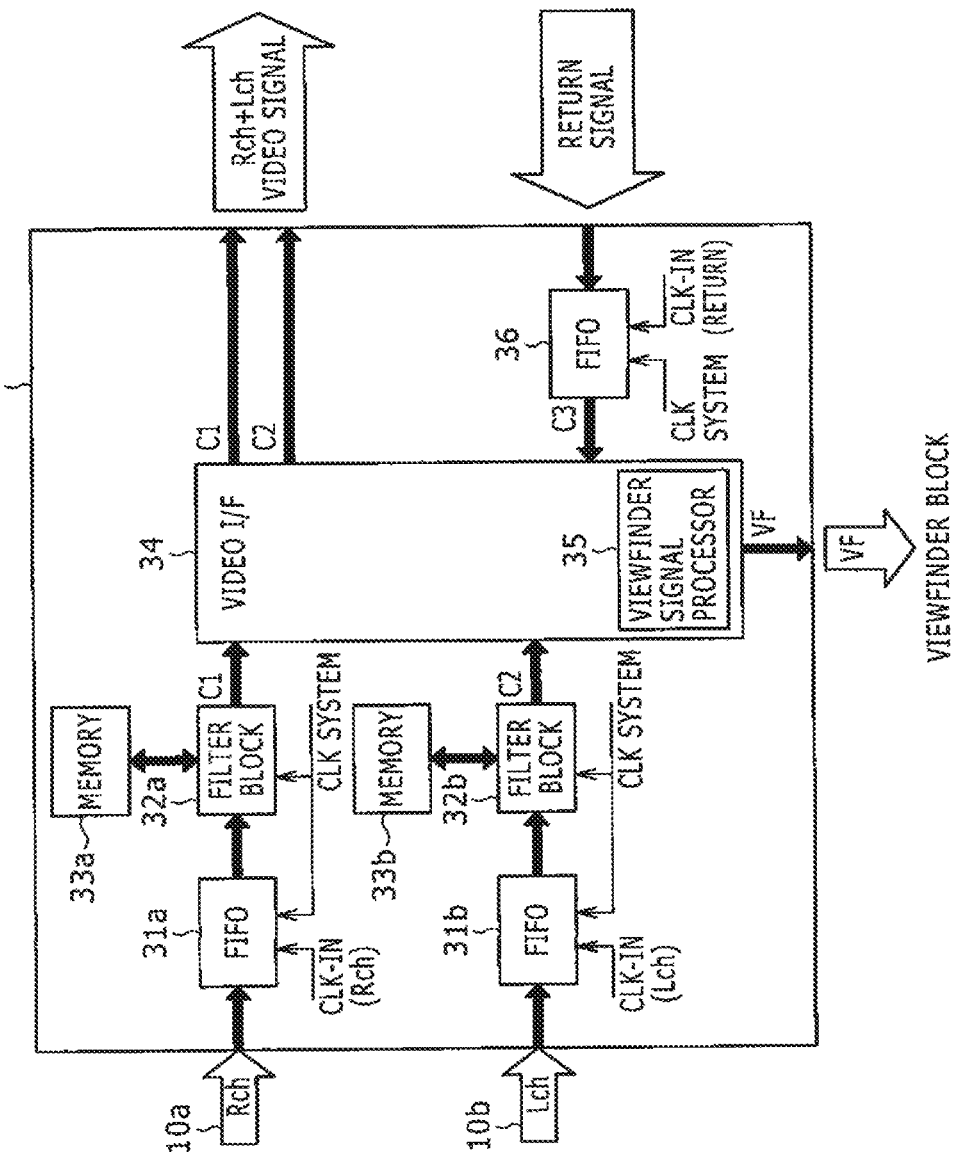
FIG. 7 is a block diagram illustrating an exemplary internal configuration of a video interface block shown in FIG. 5.

Referring to FIG. 7, there is shown an exemplary internal configuration of the video interface block 24.

The video interface block 24 has FIFO memories 31*a* and 31*b* for storing video signals entered from the camera heads 10*a* and 10*b*, respectively, in a first-in first-out basis, memories 33*a* and 33*b* for temporarily storing video signals read from the FIFO memories 31*a* and 31*b*, and filter blocks 32*a* and 32*b* for appropriately accessing the memories 33*a* and 33*b* to horizontally and vertically filter the video signals. The video interface block 24 also has the video interface block 34 for outputting the video signals (C1 and C2) received from the filter blocks 32*a* and 32*b* to the video interface block 26. The video interface block 34 also has a function as a selector for selecting one of the video signals (C1 and C2) to be outputted to the video interface block 26.

In addition, the video interface block 34 has a viewfinder signal processor 35 for generating viewfinder signals outputted to the viewfinder block 13 by the video signals received from the filter blocks 32*a* and 32*b*. The viewfinder signals are outputted to the viewfinder block 13. The viewfinder block 13 displays various viewfinder images accordingly.

The video interface block 24 has a FIFO memory 36 for storing a return signal received from the video interface block 26, on a first-in first-out basis. The return signal read from the FIFO memory 36 is transmitted to the video interface block 34 for use in a predetermined processing operation.

Referring to FIG. 8, there is shown an exemplary internal configuration of the CPU 19*a* of the camera head 10*a*, the CPU 10*b* of the camera head 10*b*, and the CPU 23 of the camera adaptor box 12.

The CPU 23 of the camera adaptor box 12 has camera adaptor data 41 for controlling operations of the camera adaptor box 12, a correction processing block 43 for executing correction by predetermined correction functions, and correction data 42 that is entered in the correction processing block 43. The camera adaptor data 41 and the correction data 42 are stored in a memory, not shown.

The CPUs 19*a* and 19*b* of the camera heads 10*a* and 10*b* have camera, data 45*a* and 45*b* for providing data unique to the camera heads 10*a* and 10*b* on the basis of the control signals received from the CPU 23, and trim data 46*a* and 46*b* for correcting the individual differences of the camera heads 10*a* and 10*b*, respectively. In addition, the CPUs 19*a* and 19*b* has adding blocks 47*a* and 47*b* for adding the trim data 46*a* and 46*b* to each control signal and a DSP (Digital Signal Processor) 48*a* and DSP 48*b* for controlling operations of the components of the camera heads 10*a* and 10*b* on the basis of control signals received from the adding block 47*a* and 47*b*.

The following describes each of the above-mentioned components.

First, the control panel 11 outputs a control signal to the camera adaptor box 12, thereby outputting a predetermined control command. Next, the CPU 23 stores the command received from the control panel 11 into camera adaptor data 41 and controls the camera head 10a as instructed by the stored command. It should be noted here that the operations of the camera heads 10a and 10b in mechanism or software may not actually match each other even if the imaging conditions of the camera heads 10a and 10b are equal between the camera heads 10a and 10b. A mismatch between the operations of the camera heads 10a and 10b is referred to a "difference." The camera adaptor box 12 eliminates this difference to prevent the images taken by the camera heads 10a and 10b from being shifted.

The camera adaptor box 12 has correction data 42 for correcting the difference between the camera heads 10a and 10b. On the basis of the operation of the camera head 10a, the difference to the operation of the camera head 10b relative to the operation of the camera head 10a is corrected by the correction processing block 43. Consequently, the camera adaptor box 12 corrects the command from the control panel 11 by a given function, thereby controlling the camera head 10b. For example, the correction processing block 43 can correct the irises of the camera heads 10a and 10b by use of a correction function to be described later.

Hence, the control signal for operating the camera head 10a is outputted to the camera head 10a without being corrected by the camera adaptor box 12. The CPU 19a in the camera head 10a corrects the command issued from, the control panel 11 by given camera data 45a and trim data 46a to the control signal and then outputs a command to the DSP 48a. Consequently, the DSP 48a controls the operation of the camera head 10a.

On the other hand, the control signal corrected by the correction processing block 43 is outputted to the camera head 10b. The CPU 19b in the camera head 10b gives camera data and adjustment data to the control signal to correct the command issued from the control panel 11 and outputs the corrected command to the DSP 48b. Consequently, the DSP 48b controls the operation of the camera head 10b.

The camera heads 10a and 10b installed on the mount 7 are arranged so that the lens optical axes cross each other at right angles as shown in FIGS. 4A and 4B and the camera head 10a outputs a video signal with up/down and left/right directions aligned relative to a subject. However, the camera head 10b is arranged with the imaging direction in which imaging is done by the camera head 10b inverted. Therefore, the images outputted by the camera heads 10a and 10b are inverted in the vertical image.

Therefore, if the vertical direction is inverted, the video interface block 24 in the camera adaptor box 12 delays the output of the video signal received from the camera head 10a by a time equivalent to one field and outputs the delayed signal. On the other hand, because the line scan of the video signal received from the camera head 10b is opposite in direction with the line scan of the video signal received from the camera head 10a, the video interface block 24 makes adjustment so that one field of the video signal is stored and outputted by substantially the similar line scan to the video signal received from the camera head 10a. This processing allows the camera adaptor box 12 to provide synchronization between the frames of the video signals received from the camera heads 10a and 10b and output the synchronized video signals to the camera control unit 14.

Figure 9A:
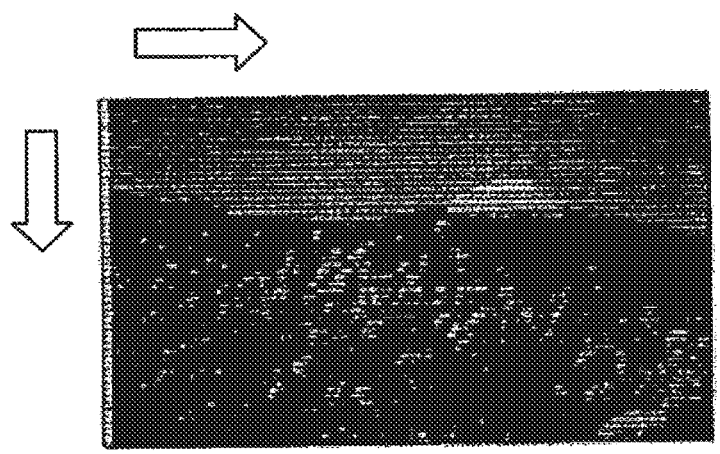
FIGS. 9A and 9B are pictures indicative of exemplary images taken by scan lines in the embodiment shown in FIG. 1.
Figure 9B:
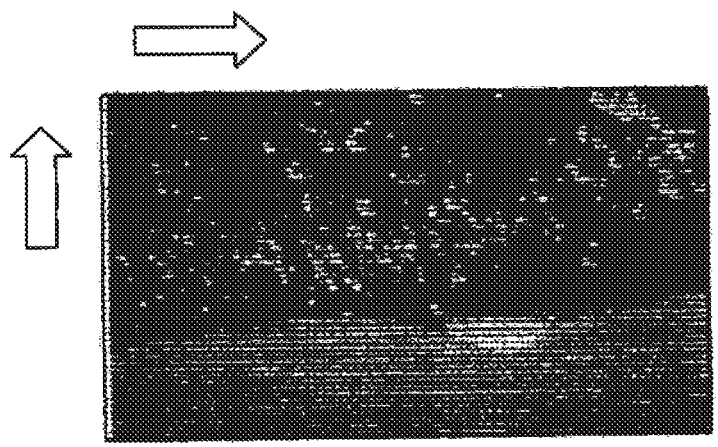

Referring to FIGS. 9A and 9B, there are shown examples in which matches are made between the imaging timings and video output timings of the camera heads 10a and 10b by changing scan directions if the camera heads 10a and 10b are of sequential scan type as CMOS sensors.

It is assumed that FIG. 9A shows an image being taken by the camera head 10a, then FIG. 9B shows an image being taken by the camera head 10b. At this moment, the vertical scan sequence of the camera head 10b may be inverted to make the imaging time of the image match that of the camera head 10a and also match the video output timing (the camera head 10b has a function of setting scan directions as desired).

Figure 10:
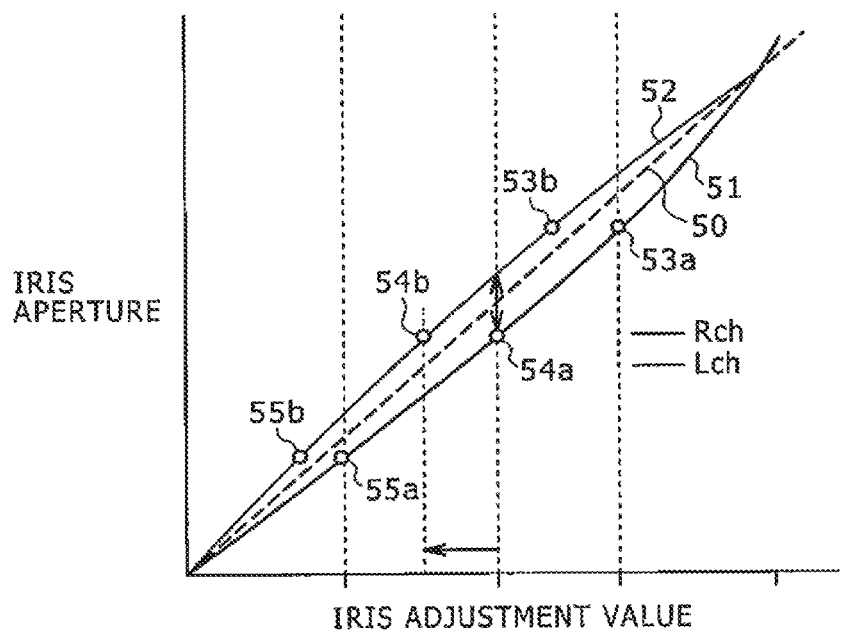
FIG. 10 is a graph indicative of an exemplary relation between iris adjustment value and iris aperture in the cameras shown in FIG. 1.
Figure 11:
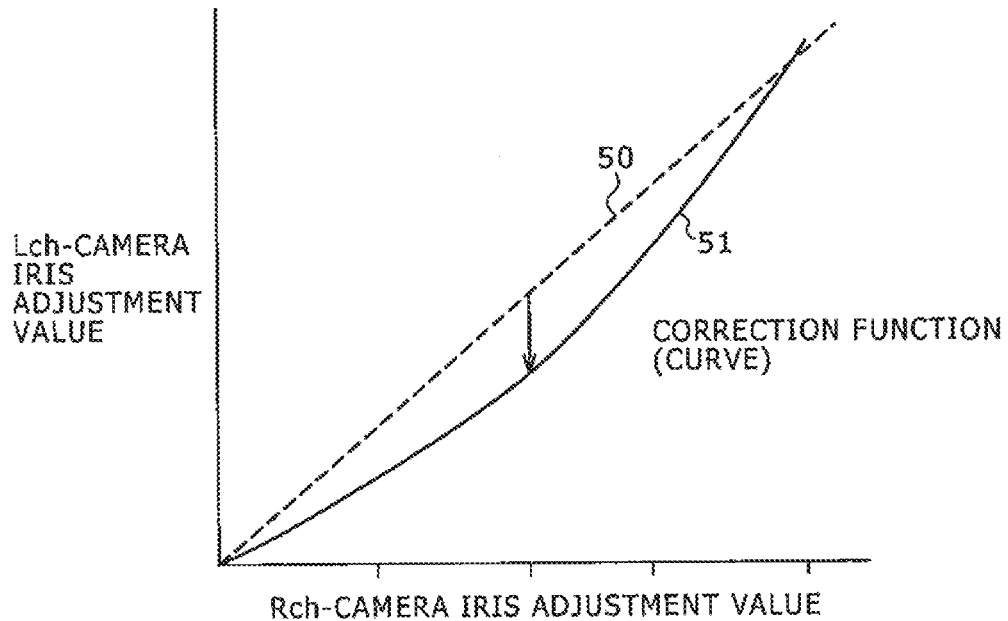
FIG. 11 is a graph indicative of an example of correcting the iris aperture of the cameras shown in FIG. 1 by use of a correction function.
Figure 12:
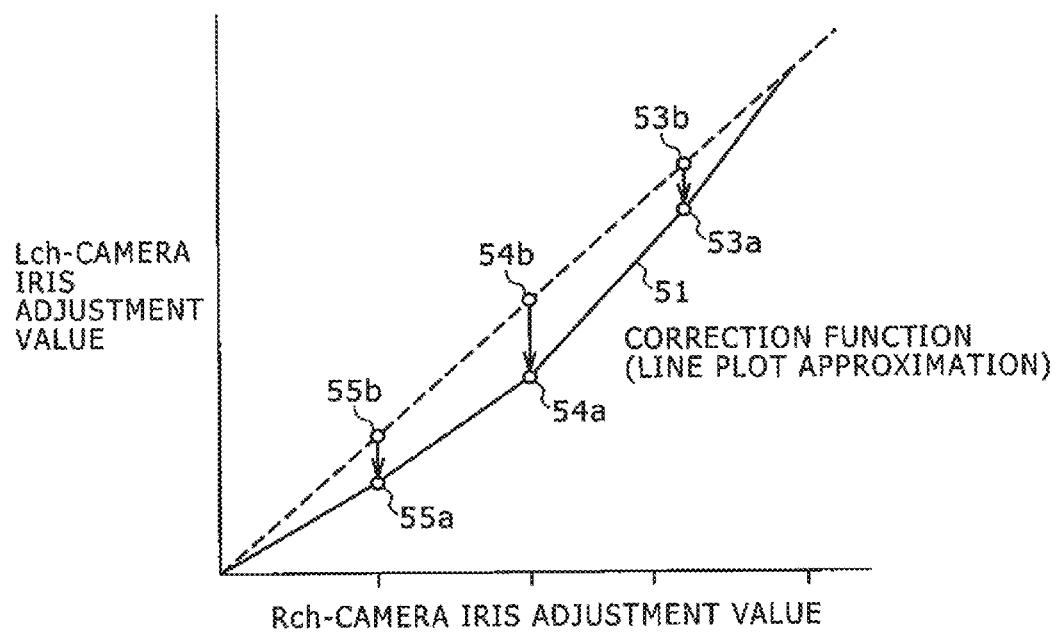
FIG. 12 is a graph indicative of an example of correcting the iris aperture of the cameras shown in FIG. 1 by use of a correction function approximating a line plot.

FIGS. 10 through 12 show examples of correction functions that are used by the correction processing block 43 to correct the iris of the camera head 10b.

Referring to FIG. 10, there is shown an example of iris adjustment values to be given to the camera heads 10a and 10b and actual iris apertures.

First, an iris control signal is transmitted from the control panel 11 to the camera adaptor box 12 via the camera control unit 14. This iris control signal is used for an iris adjustment value for adjusting the irises of the camera heads 10a and 10b.

It is desired here that the iris adjustment value indicated by the camera control unit 14 and the iris aperture value at the time the irises of the camera heads 10a and 10b are actually driven change ideally along a line 50. However, the figure is indicative that the iris aperture of the camera head 10a changes along a correction function 51 and the iris aperture of the camera head 10b changes .along a line 52. Hence, there possibly occurs a difference between the iris apertures of the camera heads 10a and 10b relative to the iris adjustment value, thereby resulting in differences in luminance and so on of the taken image. Therefore, by use of a correction curve shown in FIG. 11, the CPU 23 converts the iris adjustment value transmitted to the camera head 10b into the control value of the iris adjustment value transmitted to the camera head 10a.

Referring to FIG. 11, there is shown an example of iris adjustment values to be given to the camera heads 10a and 10b.

As described above, although the same iris adjustment value is used on the camera heads 10a and 10b, the camera heads 10a and 10b use different iris apertures. Hence, with reference to the camera head 10a, the degree of change for the camera head 10b is defined by a curve correction function. The values of the correction function changes from time to time depending on the correction data 42. As shown in the figure, the change in the iris adjustment value to be given to the camera head 10b can be made go along a correction function 51 indicative of the change in the iris adjustment value to be given to the camera head 10a, thereby operating the camera heads 10a and 10b with a same iris aperture.

Referring to FIG. 12, there is shown an example of iris adjustment values to be given to the camera heads 10a and 10b.

The correction function 51 shown in FIG. 12 is generally the same as the correction function 51 shown in FIG. 11 except for plots 53a through 55a specified on the correction function 51 shown in FIG. 10 that are for approximating the correction 51 with a dotted line. The correction values of the iris adjustment values of the camera heads 10a and 10b are measured in advance, and then the correction function is approximated by the dotted line on the basis of the measured correction values. At this moment, plots 53b through 55b in the iris adjustment value to be given to the camera head 10b are corrected in match with the plots 53a through 55a, respectively.

FIGS. 13A to 14C show examples of images that are displayed on the viewfinder block 13.

The camera adaptor box 12 can select, as a viewfinder signal, an output image of the camera head 10a, an output image of the camera head 10b, a mixed output image of the camera heads 10a and 10b, and a differential image between the output images of the camera heads 10a and 10b and display the selected image on the viewfinder block 13.

Then, the engineer can operate a menu interface displayed on the viewfinder block 13, a rotary switch attached to the camera adaptor box 12, or allocate push switches or sequentially operate the push switches, thereby selecting images to be displayed on the viewfinder block 13. The engineer can also switch an image to be displayed on the viewfinder block 13 to a return signal in response to a request for receiving from the camera control unit 14 or the like, thereby outputting the return signal. In addition, if the viewfinder block 13 is compatible with 3D image display, the engineer can display images for two channels outputted from the left and right channels and add a selection menu for this purpose.

Figure 13A:
FIGS. 13A, 13B, and 13C are pictures indicative of display examples of images shown on a viewfinder block shown in FIG. 1.

FIG. 13A shows an example of an image of the right channel that is outputted from the camera head 10a.

Figure 13B:

FIG. 13B shows an example of an image of the left channel that is outputted from the camera head 10b.

Because the camera heads 10a and 10b are arranged on the mount 7 in match with the parallax of user, a horizontal shift is observed between the images of the right channel and the left channel.

Figure 13C:

FIG. 13C shows an example of a mixed image obtained by mixing the images outputted from the camera heads 10a and 10b.

A mixed image is obtained by adding a luminance signal and a chrominance signal (Lch_Y, Lch_CB, Lch_CR) of the camera head 10b (the left channel) to a luminance signal and a chrominance signal (Lch_Y, Rch_CB, Rch_CR) of the camera head 10a (the right channel). This mixed signal is colored.

Figure 14A:
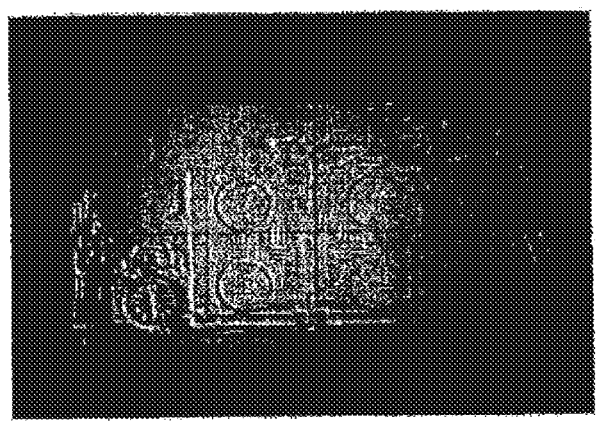
FIGS. 14A, 14B, and 14C are pictures indicative of display examples shown on the viewfinder block shown in FIG. 1.

FIG. 14A shows an example of a differential image. A differential image is a gray image obtained by subtracting a video signal outputted from the camera head 10a from a video signal outputted from the camera head 10a. FIG. 14A shows a differential image obtained by taking a video chart. At this moment, the video interface block 24 displays the differential image on the viewfinder block 13 on the basis of a difference between the luminance signal or chrominance signal of an image taken by the camera head 10a and the luminance signal or chrominance signal taken by the camera head 10b.

The differential image is obtained by subtracting the luminance signal (Rch_Video) of the camera head 10a (the right channel) from the luminance signal (Lch_Video) of the camera head 10b (the left channel). It is also practicable to subtract the luminance signal of the camera head 10b (the left channel) from the luminance signal of the camera head 10a (the right channel). Then, an obtained differential value is divided by 2 or another proper number and a result of the division is added with a video level (50_Video_Level) of a proper value as an offset.

The above-mentioned explanation can be expressed as follows:

(Lch_Video−Rch_Video)/2+50_Video_Level

As a result, a differential image with attention put only on luminance can be displayed on the viewfinder block 13.

Likewise, it is practicable to create differential data on the basis of chrominance data. At this time, a difference is obtained by subtracting a chrominance signal (Rch_CB, Rch_CR) of the camera head 10a (the right channel) from a chrominance signal (Lch_CB, Lch_CR) of the camera head 10b (the left channel).

(Lch_CB−Rch_CB)/2 or (Lch_CR−Rch_CB)/2

It should be noted, however, that, because point 0 is the intermediate point, an offset value need not be added in this case. For highlighted display, color intensification may be made by the multiplication by a proper value without the division by 2.

Thus, a monochrome mode in which only luminance is displayed as a differential image and a color mode in which chrominance data is added can be displayed on the viewfinder block 13.

If the zoom and direction of the camera heads 10a and 10b are correctly arranged, there occurs no shift in video, so that a resultant differential image is in an ideal state in which no outline is displayed. However, if there is a difference between the arrangements of the camera heads 10a and 10b, there occurs a shift between the two images, resulting in the enhanced outline of the subject as shown on the left side in FIG. 14A. This provides information that is effective in correctly setting the zoom and direction of the camera heads 10a and 10b set on the mount 7.

Figure 14B:
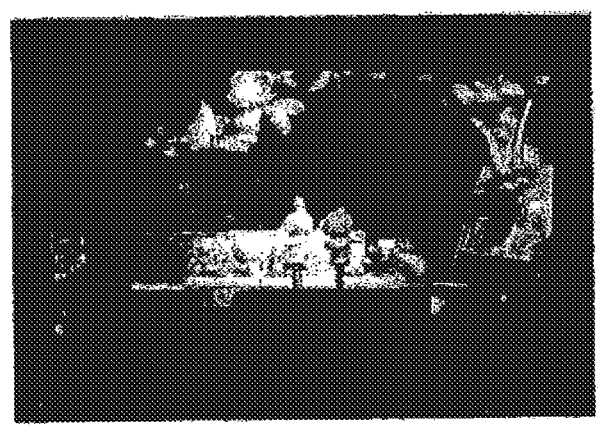

FIG. 14B shows an example of an anaglyph image.

In related art, an anaglyph image is used to provide a 3D image. For example, through a red cellophane film for the left eye and a blue cellophane film for the right eye, the user can get a 3D image effect.

Figure 14C:
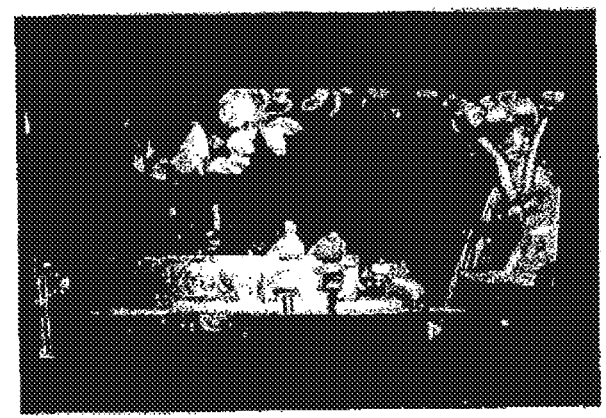
Figure 15:
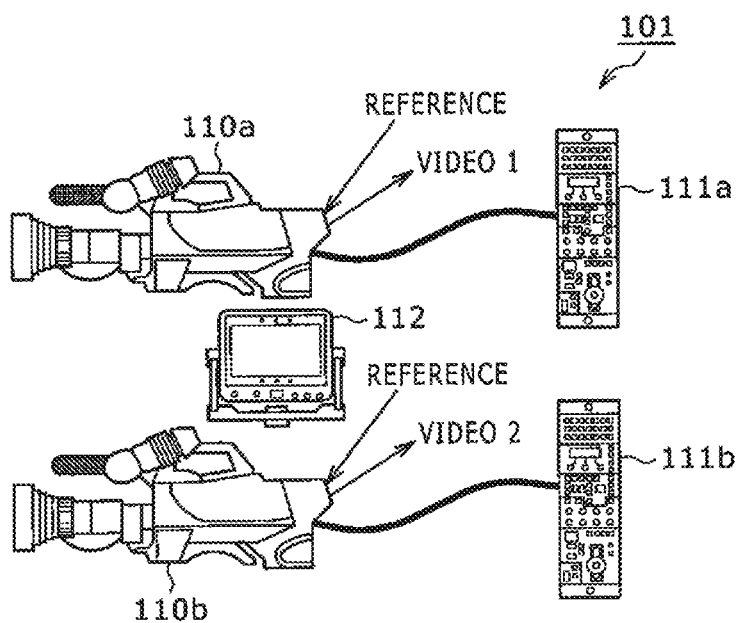
FIG. 15 is a schematic diagram illustrating a related-art 3D camera system.
Figure 16:
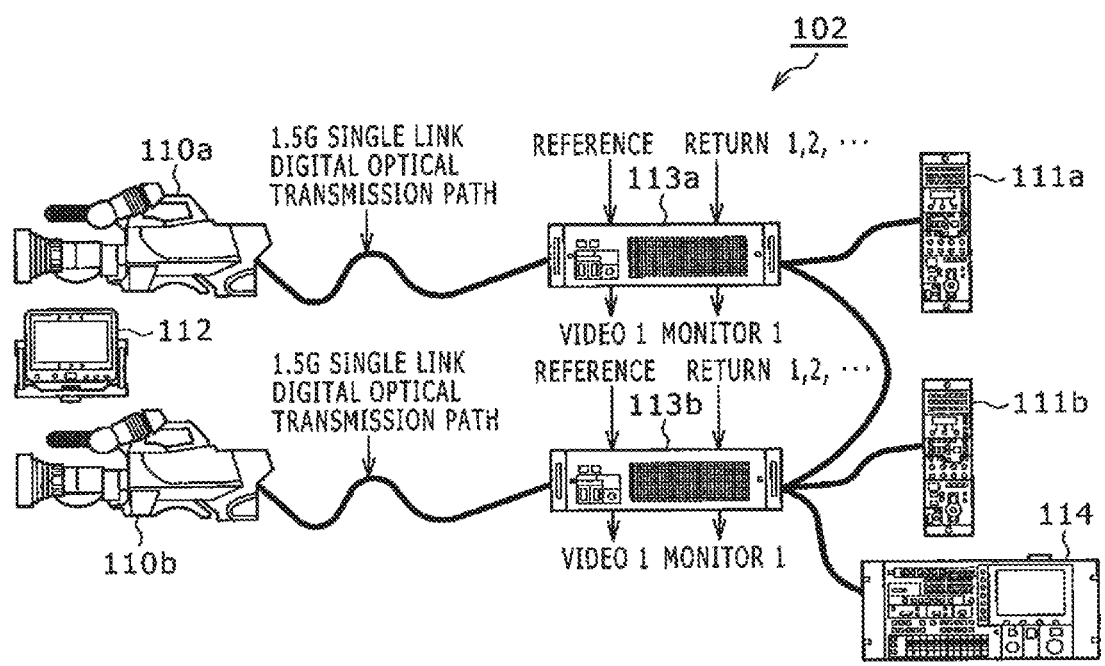
FIG. 16 is a schematic diagram illustrating another related-art 3D camera system.
Figure 17:
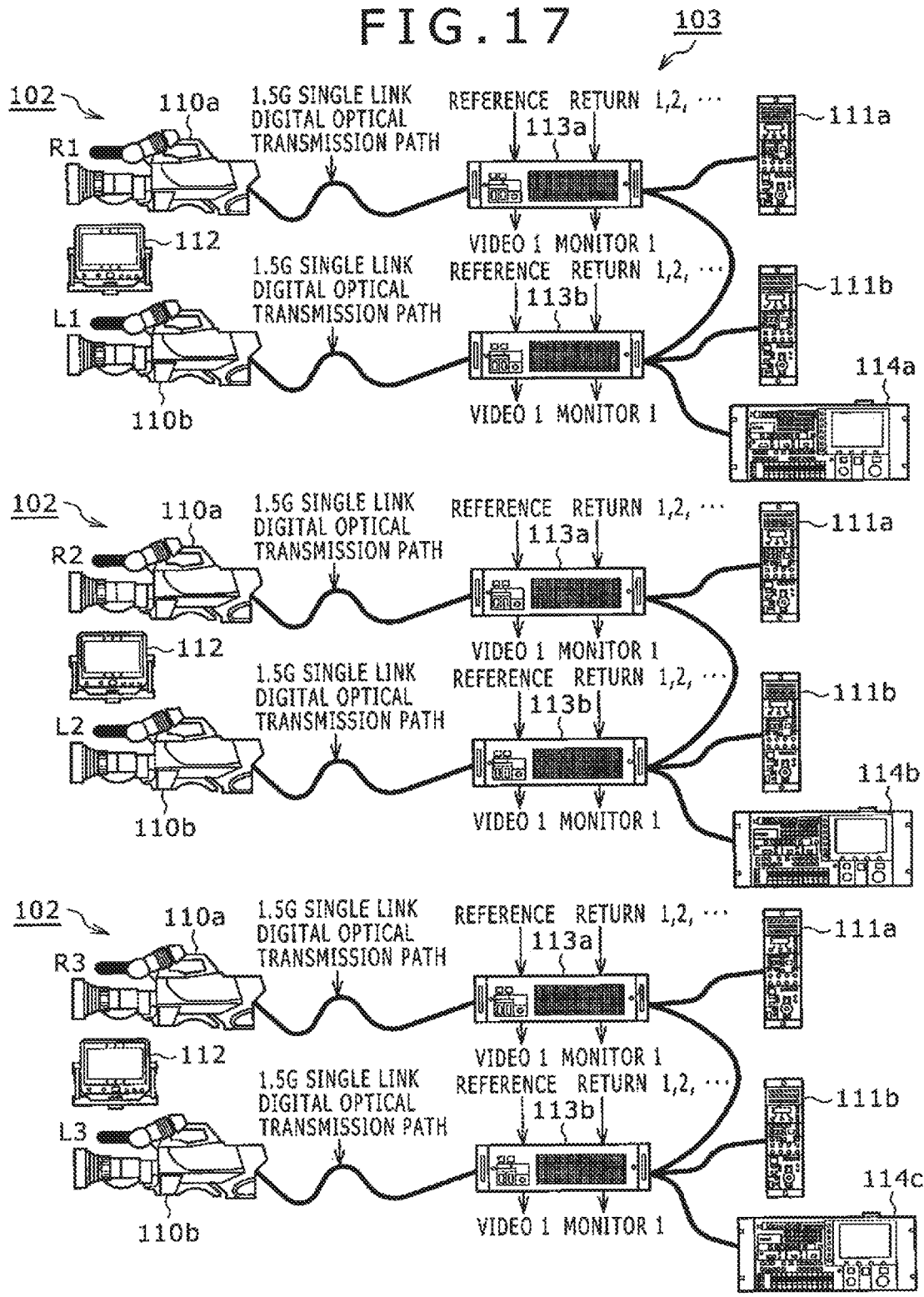
FIG. 17 is a schematic diagram illustrating still another related-art 3D camera system.

FIG. 14C shows an example of divided image obtained by dividing images.

In this example, the right half of an image outputted from the camera head 10a and the left half of an image outputted from the camera head 10b are connected with each other at the centers thereof, the resultant image being displayed. This allows the engineer to understand distortions and the like of the installation positions of the camera heads 10a and 10b, making it easy to align the distortions in the horizontal direction. It should be noted that, although not shown, the upper half of an image outputted from the camera head 10a and the lower half of an image outputted from the camera head 10b may be connected with each other at the center thereof. In this case, it becomes easy to align the distortion in the vertical direction of the camera heads 10a and 10b.

According to the above-described camera adaptor box 12 practiced as one embodiment of the invention, a differential value of an operation of the camera head 10b relative to the camera head 10a is obtained with reference to an operation of the camera head 10a. Then, the operation of the camera head 10b is controlled on the basis of the differential value. Consequently, in outputting, from the control panel 11, a control signal for the camera adaptor box 12 to control operations of the camera heads 10a and 10b, the engineer can control the two units of the camera heads 10a and 10b as if the camera heads 10a and 10b were one unit of camera head. In addition, because the camera heads connected to the camera adaptor box 12 look like one unit from the camera control unit 14 constituting the camera systems 2 and 3, the configuration of the camera systems 2 and 3 will not be complicated. Further, the camera heads 10a and 10b output the homogeneous images with the differences thereof removed, so that effects can be obtained that an output suitable for a 3D image in which two images are combined for display is obtained.

In order to operate a system of two or more (3D) cameras (in this example, the camera heads 10a and 10b) or largely extend the distance between the camera, the control panel, and the device that receives video signals, a system configuration having a camera control unit (CCU) can be provided. Consequently, the volume of wiring to the camera side (the camera heads 10a and 10b and the camera adaptor box 12) can be reduced to realize the flexible operation of the linked imaging with two or more cameras such as live system cameras. This novel configuration enables 3D cameras to realize a system camera configuration substantially similar to that based on related-art 2D imaging.

Besides, the engineer can simultaneously control the camera heads 10a and 10b while correcting the difference between the camera heads 10a and 10b by use of a correction function and so on. This facilitates the cooperative linkage between the camera heads 10a and 10b. Thus, handling the two units of the camera heads 10a and 10b used in the 3D camera systems 1 through 3 facilitates the camera operation (live coverage, relay, and so on) in 3D camera systems.

The timing generation circuit 22 of the camera adaptor box 12 can provide a match between the imaging timings in accordance with the output timing of an image in which a difference has occurred to adjust the imaging timings of the camera heads 10a and 10b, thereby simultaneously taking a subject. In addition, the video interface block 24 executes processing such as inverting an image outputted from the camera head 10b in match with the imaging timing outputted by the timing generation circuit 22, thereby matching the outputting timing of the image outputted from the camera adaptor box 12. Therefore, in matching the images outputted from the camera heads 10a and 10b as a 3D image, the images having no feeling of unnaturalness can be outputted.

Further, by use of the images outputted from the camera heads 10a and 10b, not only the image for each channel, but also a mixed image, a differential image, a anaglyph image, and a divided image can be outputted to the viewfinder block 13 and a display device, not shown. Therefore, effects can be obtained that the adjustment of the irises and setting positions of the camera heads 10a and 10b are facilitated.

2. Variations

It should be noted that, in the above-described embodiment, iris adjustment values are set for the correction made by use of correction functions, the correction may also be made for zoom setting values and so on by use of correction functions. The values to be correction are not limited to iris and zoom values.

In the above-described embodiment, an example has been described in which the camera heads 10a and 10b have no viewfinder block; however, it is also practicable that the two units of cameras each have a viewfinder block.

The above-mentioned sequence of processing operations may be executed by software as well as hardware. When the above-mentioned sequence of processing operations is executed by software, the operations can be executed by a computer in which the programs constituting the software are installed in dedicated hardware equipment or a computer in which the programs for executing various functions are installed. For example, the programs constituting the desired software may be installed into a general-purpose personal computer or the like for the execution of various functions.

Further, a recording media storing the program codes of software for realizing the functions of the above-mentioned embodiments may be supplied to the system or apparatuses concerned. It is also practicable to realize the above-mentioned functions by making the computers (or the controllers such as CPUs) of the system or apparatuses read program codes from the recording media for execution.

The above-mentioned recording media for storing program codes include a flexible disk, a hard disk, an optical disk, a magneto-optical disk, a CD-ROM, a CD-R, a magnetic tape, a nonvolatile memory card, or a ROM, for example.

Executing program codes read by the computer realizes the functions of the above-mentioned embodiments. In addition, on the basis of the instructions given by these program codes, the operating system (OS) and so on running on the computer execute part or all of the actual processing. The above-mentioned functions of the above-mentioned embodiments are also realized by this execution processing.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2009-292608 filed in the Japan Patent Office on Dec. 24, 2009, the entire content of which is hereby incorporated by reference.

What is claimed is:

1. A video camera system comprising:
a first image sensor configured to output a first image signal:
a second image sensor configured to output a second image signal:
a memory configured to store correction data for correcting a difference between an imaging state of the first image sensor and an imaging state of the second image sensor, the correction data being different from a timing control signal;
a camera control unit configured to provide an input command from an operator for simultaneous control of the imaging states of the first and second image sensors in response to the input command: and
circuitry configured to control the first image sensor and the second image sensor by the timing control signal, obtain a first control signal and a second control signal based on the correction data and corresponding to said input command, the first control signal controlling the first image sensor to execute imaging operations corresponding to said input command to output the first image signal, and the second control signal controlling the second image sensor to execute imaging operations corresponding to said input command to output the second image signal, the first control signal having a value that is different from the value of the second control signal, and
generate a three-dimensional image signal based on the first image signal corrected by the first control signal and the second image signal corrected by the second control signal to be displayed as a three-dimensional video on a display.

2. The video camera system according to claim 1, wherein the first control signal causes the first image sensor to perform the first imaging in response to the input command, and the second control signal causes the second image sensor to perform the second imaging in response to said input command.

3. The video camera system according to claim 1, wherein each of the first image sensor and the second image sensor is a CMOS image sensor.

4. The video camera system according to claim 1, wherein each of the first image sensor and the second image sensor is a CCD image sensor.

5. The video camera system according to claim 1, wherein the circuitry is further configured to
   perform a first imaging processing on the first image signal with a first processing time,
   perform a second imaging processing on the second image signal with a second processing time different from the first processing time,
   adjust a first output timing of the processed first image signal and a second output timing of the processed second image signal, and
   generate the three-dimensional image signal from the processed first and second image signals.

6. The video camera system according to claim 5, wherein the first image sensor has a first imaging timing signal and the second image sensor has a second imaging timing signal, wherein the circuitry adjusts the first output timing and the second output timing based on a difference between the first imaging timing signal and the second imaging timing signal and a difference between the first processing time and the second processing time so that the first output timing and the second output timing are same.

7. The video camera system according to claim 1, wherein the displayed three-dimensional video includes a first area displayed as a first image based on the first image signal and a second area displayed as a second image based on the second image signal.

8. The video camera system according to claim 7, wherein the first area is on a right side from center of the displayed three-dimensional video and the second area is on a left side from the center of the displayed three-dimensional video.

9. A method of obtaining a three-dimensional video from image signals, comprising:
   outputting a first image signal from a first image sensor;
   outputting a second image signal from a second image sensor;
   providing stored correction data, different from a timing control signal, for correcting a difference between an imaging state of the first image sensor and an imaging state of the second image sensor;
   providing an input command from an operator for simultaneous control of the imaging states of the first and second image sensors in response to the input command;
   controlling the first image sensor and the second image sensor by the timing control signal;
   obtaining a first control signal and a second control signal based on the correction data and corresponding to said input command, the first control signal controlling the first image sensor to execute imaging operations corresponding to said input command to output the first image and the second control signal controlling the second image sensor to execute imaging operations corresponding to said input command to output the second image the first control signal having a value that is different from the value of the second control signal; and
   generating a three-dimensional image signal based on the first image signal corrected by the first control signal and the second image signal corrected by the second control signal to be displayed as the three-dimensional video on a display.

10. The method of claim 9, wherein the first control signal causes the first image sensor to perform the first imaging in response to the input command, and the second control signal causes the second image sensor to perform the second imaging in response to said input command.

11. The method of claim 9, further comprising:
   performing a first imaging processing on the first image signal with a first processing time;
   performing a second imaging processing on the second image signal with a second processing time different from the first processing time;
   adjusting a first output timing of the processed first image signal and a second output timing of the processed second image signal; and
   generating the three-dimensional image signal from the processed first and second image signals.

12. The method of claim 11, wherein the first output timing and the second output timing are adjusted based on a difference between a first imaging timing signal of the first image sensor and a second imaging timing signal of the second image sensor and a difference between the first processing time and the second processing time so that the first output timing and the second output timing are same.

13. The method of claim 9, wherein the displayed three-dimensional video includes a first area displayed as a first image based on the first image signal and a second area displayed as a second image based on the second image signal.

14. The method of claim 13, wherein the first area is on a right side from center of the displayed three-dimensional video and the second area is on a left side from the center of the displayed three-dimensional video.

\* \* \* \* \*